J. A. WERNER.
DEPARTMENTAL CASH REGISTER.
APPLICATION FILED NOV. 21, 1910.

1,152,582.

Patented Sept. 7, 1915.
11 SHEETS—SHEET 1.

WITNESSES:

INVENTOR
John A. Werner
BY
ATTORNEYS

J. A. WERNER.
DEPARTMENTAL CASH REGISTER.
APPLICATION FILED NOV. 21, 1910.

1,152,582.

Patented Sept. 7, 1915.
11 SHEETS—SHEET 10.

WITNESSES:
H. F. Sadgbury
R. [illegible]

INVENTOR
John A. Werner
BY [signature]
ATTORNEYS

UNITED STATES PATENT OFFICE.

JOHN A. WERNER, OF DAYTON, OHIO, ASSIGNOR TO THE NATIONAL CASH REGISTER COMPANY, OF DAYTON, OHIO, A CORPORATION OF OHIO, (INCORPORATED IN 1906.)

DEPARTMENTAL CASH-REGISTER.

1,152,582.  Specification of Letters Patent.  Patented Sept. 7, 1915.

Application filed November 21, 1910. Serial No. 593,373.

*To all whom it may concern:*

Be it known that I, JOHN A. WERNER, a citizen of the United States, residing at Dayton, in the county of Montgomery and State of Ohio, have invented certain new and useful Improvements in Departmental Cash-Registers, of which I declare the following to be a full, clear, and exact description.

This invention relates to registering mechanisms and among the objects of the invention are to provide a key actuated register with a plurality of totalizing devices and a plurality of corresponding record strip holders, with means actuated by the keys for bringing any desired corresponding totalizing devices and record strip holders into operative relation with certain actuating and printing mechanism.

Another object of the invention is to provide a plurality of record strip holders, one of which is normally in operative relation with a printing mechanism, together with means for moving any other desired record strip holder into operative relation with the printing mechanism, and simultaneously moving out of operative relation, the one which is normally therein.

Another object of the invention is to provide a plurality of record strip carrying frames with a single paper feeding device, and means for moving any carrying frame into operative relation with the feeding device.

Another object of the invention is to provide a totalizer and a counter mounted in a single frame, with means for moving said frame to carry the totalizer into operative relation with its actuating mechanism, and the counter into engagement with an actuating device so that the counter will be actuated upon the meshing movement of the totalizer.

Another object of the invention is to provide multiple totalizers with a novel form of transfer mechanism, including a set of transfer racks arranged to co-act with any of the totalizers, and to be, alternately with a set of actuating racks, meshed with a selected totalizer.

Certain features of the machine shown in the drawings are also shown in the patent to Thomas Carney, #497,860, such, for instance, as the construction and arrangement of the keys; the key coupler, and the drive shaft rotated thereby. The indicators also are substantially alike in both cases.

The keys are all loosely pivoted on a rod passing from side to side through the machine, and co-act with a key coupler so that any combination of keys which are initially depressed will be compelled to move as a unit during further depression of any of them. The key coupler carries a rack engaging a pinion fast on the drive shaft, thereby rotating it, and by this shaft a selected totalizer is moved into engagement with certain actuating racks, the transfer mechanism is driven, and power is transmitted to the printing mechanism.

Individual tablet indicators are provided for each key, resting on the rear ends thereof so that the depression of a key will cause its corresponding indicator to be lifted into view.

The keys of the patent, which are depressible equal distances and arranged in denominational banks, carry uprights having slots of different length positioned to embrace and to move differentially rods fast to pivoted actuating segments, when the keys are depressed. Each segment actuates a corresponding denominational element of a totalizing device and a printing mechanism.

In the machine shown, uprights, all of like form, are carried by the keys, and have camming edges for engaging differently spaced steps on pivoted segment frames which drive actuating racks for the totalizers and the type carriers of the printing mechanism. Thus the keys may be all duplicates as may be the different elements of the totalizer actuating mechanism and need not be assembled in a particular order. The totalizing devices are arranged so that only one may be operated at an operation of the machine, therefore requiring no more power than if only a single totalizer were provided. The selecting of a totalizer, and also the rocking into and out of operative relation of corresponding carrying frames for record paper, is accomplished by the initial movement of the transaction keys. The actual driving of the machine occurs during the operation of the value keys. It results that the value keys by which the machine is operated require no more power than do the keys of the single totalizer and detail strip machines shown in the patent above mentioned.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

The value keys 1 and the class of transaction keys 2 are all similar in form, and are loosely pivoted on a rod 3 extending from side to side of the machine and mounted in the machine side frames 4. The transaction keys are arranged in a group, and the value keys in groups of denominational orders, and all the keys are provided with recesses 5 and curved surfaces 6 co-acting with a flange 7 of a key coupler 8. The key coupler is journaled in the side frames 4 by trunnions 9 the pivotal centers of which are above and to the rear of rod 3, and flange 7 rests on the upper edges of the keys, so that when any keys are depressed the flange enters the recesses 5 of the depressed keys, and comes before the curved surfaces 6 of undepressed keys, thereby coupling together depressed keys and preventing the depression of the remaining keys. This is as described in the above mentioned patent, and the coupling occurs at the beginning of movement of the keys, so that during further movement of depressed keys they are compelled to move as a unit.

Indicator tablets 10 rest on the rear ends of the keys, and when lifted into view are latched in such position until the next operation of the machine.

Each key has pivoted thereon at its rear end an upright 11 having a projecting surface 12 for engagement with a step 15 of one of a set of stepped segments 13, which are loosely pivoted on a rod 14, and one of which is provided for each denominational group of value keys and one for the group of transaction keys. The segments 13 are formed out of a metal plate twisted and cut to present two series of steps 15 and 16, differently spaced with respect to the plane of movement of the uprights 11 but equal distances apart as regards corresponding steps of the two series. The series of steps 15 are in the lines of movement of the projections 12, but as they are differently spaced therefrom, the stepped segments may be moved differentially by the depression of different keys. The corresponding steps 16 are properly spaced to engage the projection 12 on the upright of a depressed key when the segment has moved the required distance, preventing overthrow of the segments.

Accidental movement of the segments 13 is normally prevented by latches 176 having shoulders 177 engaging lugs 178 of the segments, and each latch 176 has a laterally bent flange 179 passing over inclined edges 180 of all the key uprights 11 in its respective group. Therefore, when any key is depressed, the latch 176 for its respective segment is moved out of engaging position by the inclined edge 180 of its upright, thus releasing the segment.

Figure 1:
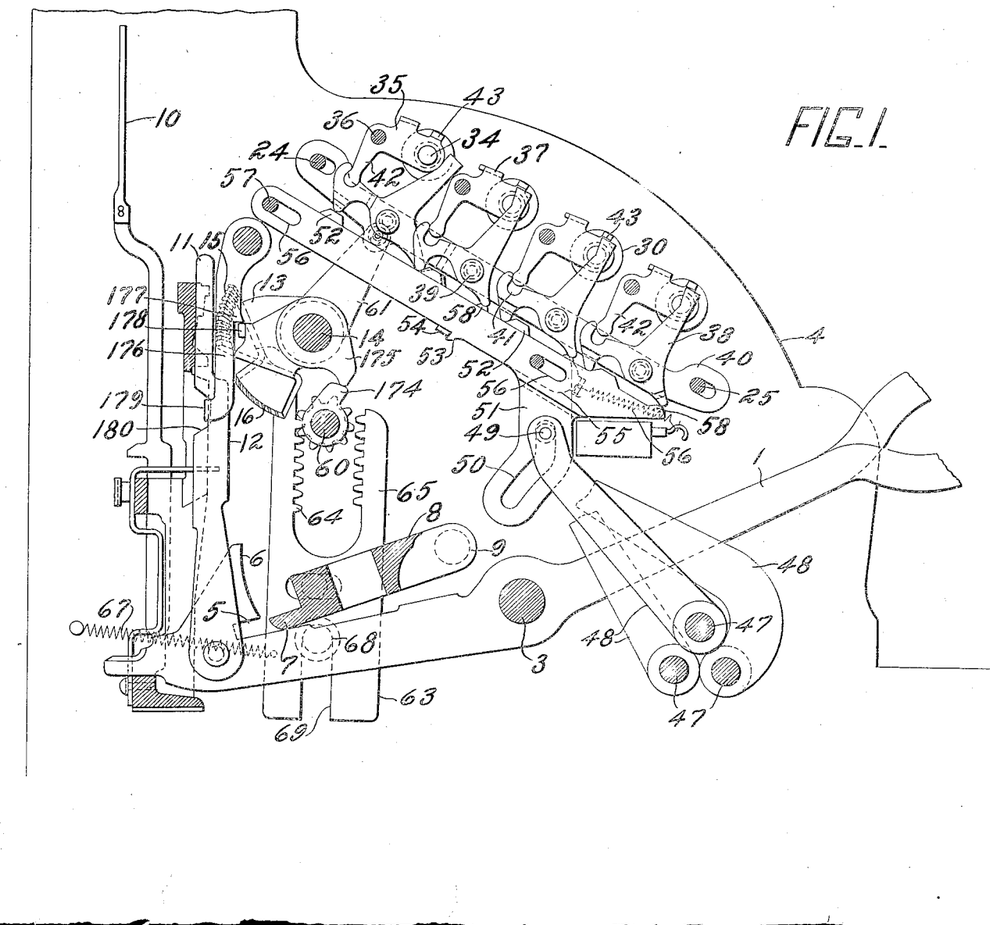
Figure 1 is a transverse vertical section of a cash register constructed according to this invention, showing the main differential mechanism of the machine and the arrangement of multiple totalizers.

The segments 13, which cooperate with the value keys, are rigid with segment gears 17 (Fig. 5) having two sets of rack teeth 18 and 19, respectively meshing with driving racks 20 and pinions 21 fast on a type wheel carrying shaft 22 and on sleeves 23 surrounding this shaft. After the totalizing and printing mechanisms have been actuated and the keys are returning, cams 174 (Fig. 1) on a shaft 60 return the segments to normal position by engaging tails 175 thereof.

The driving racks 20 are slidable on shafts 24 and 25, together with a set of totalizer actuating racks 26, to which the racks 20 are connected by pins 27 carried by racks 26 and extending through slots 28 in the racks 20. The slot and pin connection between the racks is to permit movement of the totalizer actuating racks 26 downwardly out of mesh with totalizer pinions 29, while permitting the driving racks 20 always to remain in mesh with the segments 17. The racks 26 are normally in their upper position, and are moved downwardly to permit free rotation of the totalizer pinions at carrying operations.

Figures 2, 3:
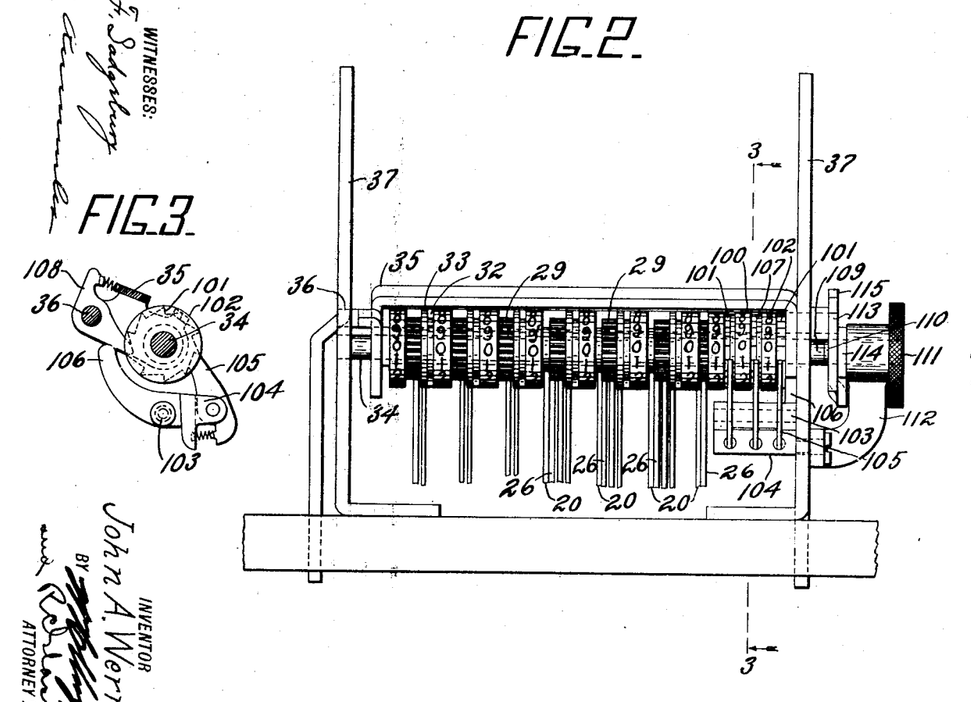
Fig. 2 is a plan view of one of the totalizers.
Fig. 3 is a sectional view of a counter, also shown in Fig. 2, and is taken on the line 3—3 of Fig. 2.

Each denominational unit of the totalizers 30 comprises, rigidly secured together, a pinion 29, a numbered drum 31, and transfer cams 32 and 33. These units are journaled on totalizer shafts 34 carried in frames 35, and each frame is pivoted on a rod 36 carried by a pair of frame bars 37 (Fig. 2) and may be rocked on the rod 36, to carry a totalizer into and out of meshing position by one of a series of bell crank levers 38 (Fig. 1) pivoted by pins 39 to a pitman 40, and having recesses 41 into which extend, or are adapted to extend, arms 42 of the frames 35. The bell crank levers 38 extend upwardly from their pivots 39 into coöperative relation with lugs 43 of the frames 35 to prevent downward rocking movement of the frames when the bell crank levers are not in engagement with the arms 42. The uppermost totalizer frame (Fig. 1) is shown in engagement with its respective bell crank lever 38, and the remaining totalizer frames are shown as being held out of engagement by their respective bell crank levers. Accordingly, with the mechanism in this condition, an upward movement of the pitman 40 will cause the uppermost totalizer to rock into operative position. This totalizer may be termed the "cash totalizer", as at a normal operation of the machine when no transaction key is depressed, it will be actuated, while the remaining totalizers are held out of mesh.

The cash totalizer may be made inoperative and another totalizer selected for operation by the depression of one of the special transaction keys 2, employed at the entry of such transactions as "Received on Account", "Charge" or "Paid Out". The transaction keys (Fig. 12) carry pins 44 extending through cam slots 45 in arms 46 which are fast to shafts 47, and at the beginning of movement of a transaction key its pin 44 is effective in the corresponding cam slot, thus rocking one of the shafts 47. These shafts carry arms 48 (Fig. 1) which have rollers 49 extending through cam slots 50 in cam slides 51. The slides 51 are all provided with slots 56 through which extend supporting rods 57, and each has a camming shoulder 52 co-acting with one of the bell crank levers 38, and a shoulder 53 extending across a lug 54 on a slide 55 similar to the slides 51 and co-acting with the cash totalizer bell crank lever 38. The slide 55 is normally held with its shoulder 52 in engagement with the cash totalizer bell crank lever by a spring 56. Accordingly, when one of the transaction keys is depressed, its respective slide 51 is moved upwardly bringing its shoulder 52 into engagement with the particular totalizer rocking lever 38, thus engaging the lever with the corresponding totalizer frame 35, and the shoulder 53 of the actuated slide 51 engages lug 54 moving the slide 55 upwardly, thereby disengaging the cash totalizer rocking lever from the totalizer carrying frame. Each slide is provided with a shoulder 58 which normally engages and holds the corresponding lever 38, but is moved away from said lever by movement of the slide when a special key is depressed.

Figures 10, 11:
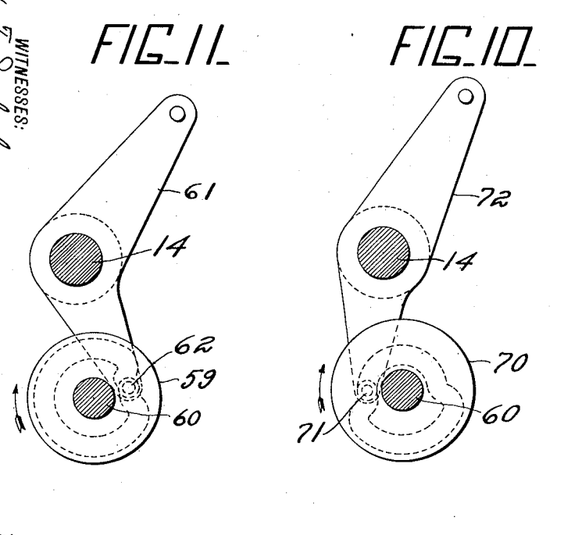

The pitman 40 carrying the rocking levers 38 is actuated by a cam 59 (Fig. 11) on shaft 60 through a lever 61 loosely pivoted on shaft 14 and having a roller 62 extending into a groove in the cam, and at its upper end the lever is pivoted to the pitman 40. The shaft 60 is rotated by a rack 63 (Fig. 1) carried by the key coupler 8 and provided with two sets of rack teeth 64 and 65 alternately engaging a pinion 66, fast to shaft 60, on the up and down strokes of the key coupler. A spring 67 serves to rock the rack 63, around a fixed pin 68, passing through a slot 69 in the rack, alternately to engage its racks 64 and 65 with the pinion at the ends of its strokes. As described in the above mentioned patent, the rack carries a lug co-acting with a fixed lug on the machine frame to prevent the rocking movement from taking place except at the limits of the stroke of the rack. Shaft 60 is also employed to lift the racks 26 into mesh with a selected totalizer before the racks are differentially operated by segments 17, and out of mesh before transferring operations take place. For this purpose the shaft carries a cam 70 (Fig. 10) acting on a roller 71 on a lever 72, which is loosely pivoted on shaft 14, and at its upper end is pivoted to a link 73 (Fig. 5) connecting a pair of arms 74 and 75 fast to the shafts 24 and 25. These shafts have short cams or arms 76 (Fig. 6) fitted in slots 77 and 78 in the actuating racks 26. Accordingly, when lever 72 is rocked by cam 70, the arms 76 first move the racks 26 upwardly into mesh with the selected totalizer, which at this time is rocked downwardly by lever 61 (Fig. 11) meeting the racks in their upper position. The machine is now in proper condition for the actuation of racks 26 which occurs as before stated, through the shoulders 12 (Fig. 1) engaging the segments 13 thereby driving both sets of racks 20 and 26, so that the desired amount is added to the selected totalizer.

Figures 6, 7:
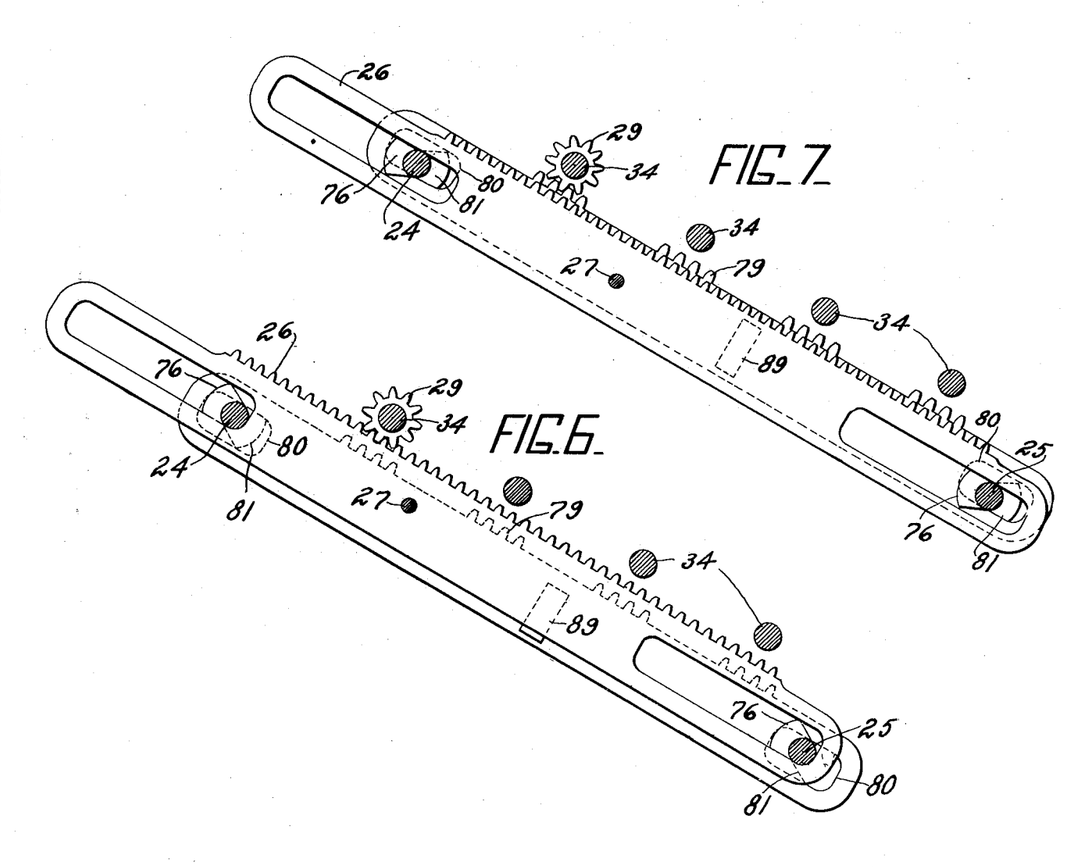
Fig. 6 is a detail in side elevation of the totalizer actuating racks and the carrying racks.
Fig. 7 is another side elevation of the totalizer actuating and carrying racks, showing the racks in position for performing a carrying operation.
Figure 8:
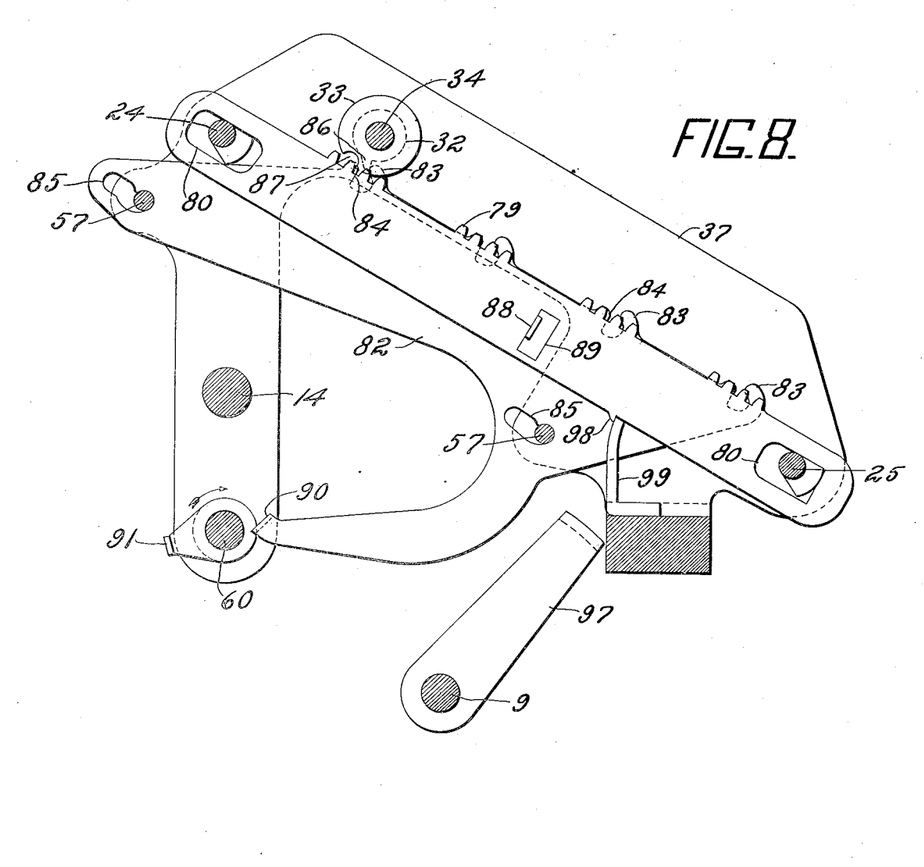
Fig. 8 is a detail in side elevation of the totalizer carrying mechanism.

When racks 26 come to rest in their moved positions, cam 70 returns the lever 72 to normal position thereby unmeshing the racks from the totalizer, which is still left in its lower position in operative relation with transfer racks 79 (Figs. 6 and 8). The transfer racks are also slidably mounted on the shafts 24 and 25 and are provided with slots 80 through which the shafts extend and in order that the transfer racks may be unmeshed from the totalizer pinions when the racks 26 are meshed, and meshed when the racks 26 are unmeshed, arms 81 oppositely placed to arms 76 are carried by shafts 24 and 25, and fit in the slots 80. Accordingly, when the racks 26 are unmeshed, the transfer racks 79 are meshed with the totalizer ready to effect required transfers. The transferring movement of the transfer racks is controlled (Fig. 8) by cams 32 and 33 rigid with the totalizer pinions, through transfer slides 82. These slides are initially moved into effective position when their respective totalizer pinions pass from nine position to the zero position, by cams 32 and 33 respectively engaging teeth 83 and 84 on the slides. The slides 82 are supported by the shafts 57 passing through slots 85 therein. When a slide is initially moved a tooth 86 of the transfer cam 32 first engages the tooth 83 of the slide, causing the slide to move forward and to rise because of the form of slots 85, thus a tooth 84 of the slide enters a recess 87 in cam 33. Because of this upward movement, the slides are prevented from being accidentally shifted at other times than when the totalizer pinions are rotating from nine to zero, as the teeth 84 then rest against the uncut edge of the cam 33. Each slide 82 is provided with a lug 88 extending through an opening 89 in a companion transfer rack 79 and the movement of a slide 82 under the action of cams 32 and 33 is sufficient to carry the lug 88 into engagement with the edge of the opening 89 opposite to that with which it is shown in engagement in Fig. 8. Further movement of the slide 82 in the same direction, after racks 26 have been unmeshed and racks 79 meshed, causes its corresponding rack 79 to effect the transfer, by rotating the higher order pinion one tooth space. The initial movement of a slide 82 causes a lug 90 carried thereby to come into operative relation with one of a group of successively operating transfer cams 91 fast to shaft 60, which then effects this further movement. The totalizer is lastly rocked out of mesh with the transfer racks 79 by the action of cam 59 (Fig. 11) as the cam nears its home position.

Figure 9:
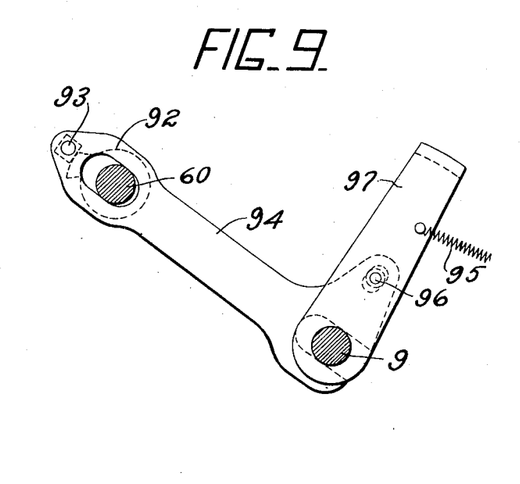
Figs. 9, 10, and 11 are details of cams carried by the main drive shaft of the machine and levers operated thereby.

For the purpose of restoring the transfer mechanism, as closely as possible after the action of cam 59, a cam 92 (Fig. 9) engages a pin 93 on a pitman 94, returning the pitman to the position shown in Fig. 9 against the action of a spring 95. The pitman is forked over the coupler trunnion 9 to be slidable thereon, and is pivotally connected by a pin 96 to a restoring yoke 97 for the purpose of rocking the yoke into engagement with the transfer slides, thus restoring the slides and through them returning the transfer racks 79. At the beginning of each operation of the machine, when cam 92 clears the pin 93, spring 95 draws the pitman downward thus rocking the yoke away from slides 82.

The transfer racks 79 are provided with lugs 98 for engagement with a retaining bar 99 when the racks are in normal position, preventing accidental movement of the transfer racks at such time. The retaining bar does not interfere with the operation of the transfer racks as they are moved forward and backward when in their upper positions only.

Loosely mounted on each totalizer shaft 34 is a counter 100 (Figs. 2 and 3) consisting of three ratchet wheels 101 and numbered drums 102. A stud 103 extends from the frame 37, and pivotally mounted thereon is a frame 104 carrying counter actuating pawls 105. This frame has an upward extension 106 which is engaged by the totalizer frame 35 when the totalizer is rocked into mesh, thereby actuating pawls 105 and causing one unit to be added to the counter. The two pawls 105 of higher order rest on disks 107 fast to the next lower order drums 102, and are held out of engagement with their respective ratchet wheels by the disks except when transfers are required, when notches in the disks come opposite the ends of the higher order pawls permitting them to spring into engagement with their respective ratchet wheels.

The numeral 108 indicates the usual retaining pawls for the counter.

Figure 5:
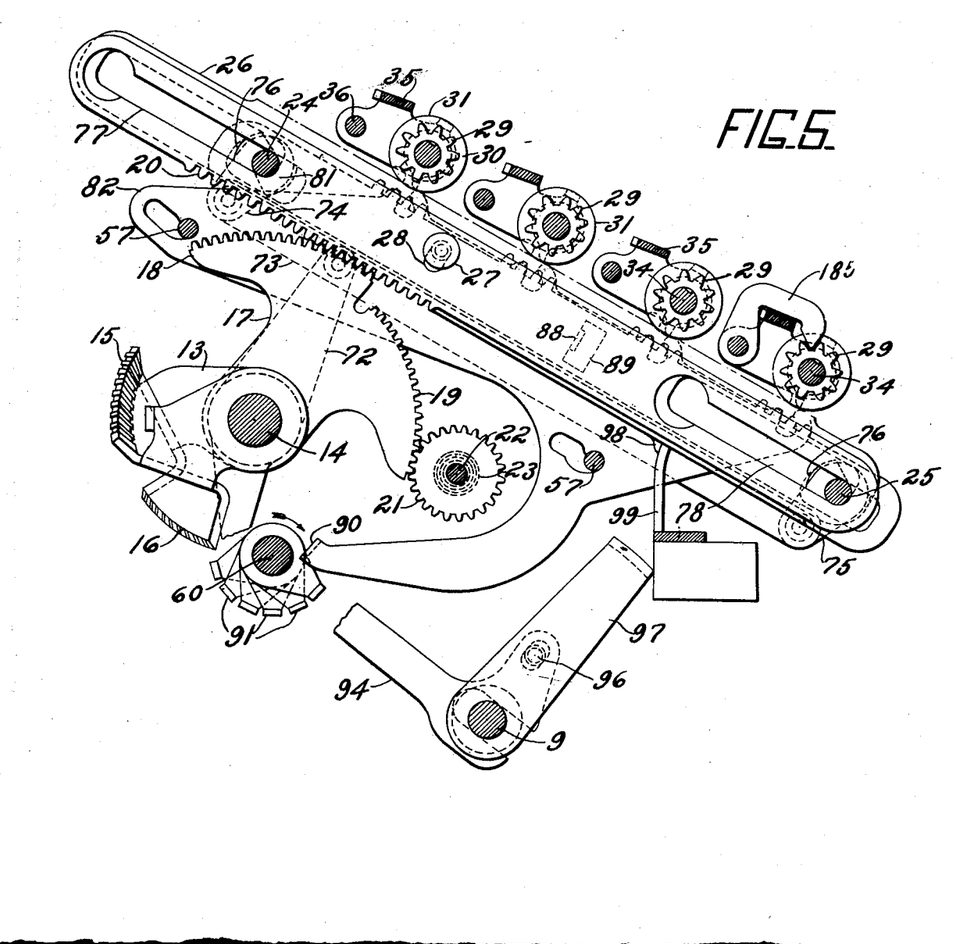
Fig. 5 is a detail in transverse vertical section of the multiple totalizers and their operating mechanism.

It will be seen that when any totalizer is in its lowered position, it is locked against improper operation, inasmuch as either the actuating or the transfer racks engage it at all times. But in its upper position neither set of racks is in mesh, and the totalizer elements might then, accidentally or by design, be disturbed. To obviate this difficulty locking arms or pawls 185 are mounted fast on the shafts 36 which support the totalizer carrying frames, as shown in Fig. 5, and are in position to hold the totalizer elements against misoperation. The shaft 36 does not move when the totalizer is lowered for operation and therefore these pawls 185 are out of engagement when actuation of the totalizer elements takes place. Thus it is evident that the totalizer elements are locked at all times whether in or out of actuating position.

Figure 4:
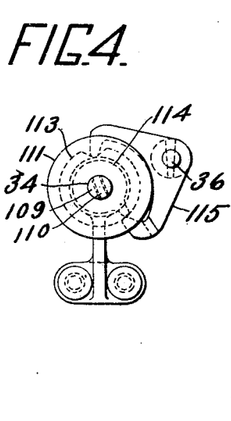
Fig. 4 is an end elevation of a resetting device shown in Fig. 2.

It is usually desired to permit resetting of the totalizers to zero positions at proper times. Mechanism for performing this function by rotating the totalizer carrying shaft is well known, and therefore no particular mechanism is shown to do this. However, with the present construction including the holding pawls 185, it is necessary to disengage these pawls to permit resetting of the totalizer. To this end each frame 37 (Fig. 2) carries a bracket 112 in which is mounted a resetting knob 111 having a tenon 110 which fits in a slot 109 in the corresponding totalizer shaft 34, this loose connection being required because the shaft 34 is moved to carry the totalizer into mesh with the rack while the bracket 112 is not depressed. The knob 111 carries cams 113 and 114 (Fig. 4) constructed to co-act with a double pawl 115 mounted fast on shaft 36. When the knob 111 is rotated to reset the totalizer these cams rock shaft 36 by moving the double pawl, and thus withdraw locking pawls 185, which are also fast on shaft 36, from engagement with the totalizer elements. These elements may then be picked up by the shaft 36 and restored to normal zero positions.

The printing mechanism is shown in Figs. 12 to 18. It was explained how the type wheel carrying shaft 22 and sleeves 23 are differentially rotated as desired by the segments 17, there being as stated, one segment for each group of keys. The type wheels 116 are each provided with two sets of type of ten characters each. Platens 117 and 118 are provided respectively above and below the type carriers and are arranged for making impressions on one of a set of detail strips 119, and on a check strip 120. The detail strips are carried by nested spools 121 in frames 122, 123, 124 and 125 pivoted on shafts 126 and 127 and toggles 128 for rocking the carrying frames are mounted at one end on the frames and at their other ends on a shaft 129. The pins 130 connecting the two arms of the toggles for the frames 123, 124 and 125 pass through links 131 connecting the toggles with arms 132 fast to shafts 47. Therefore when any one of the shafts 47 is rocked by the depression of a special key, one of the links 131 is drawn downward bending a toggle 128 and consequently rocking the corresponding detail strip carrying frame 123, 124, or 125 into operative position with the detail strip passing between platen 117 and the type wheels.

The frame 122 which carries the detail strip for receiving cash entries is normally in operative position and is rocked out of such position whenever one of the remaining frames is rocked into operative position. To accomplish such reverse rocking arm 133 (Figs. 13 and 16) of the toggle 128 for "cash" frame 122 is fast to shaft 129 while the arms 134 for the remaining toggles 128 are loose on the shaft 129 and carry shoulders 135 (Fig. 17) on their hubs for engaging shoulders 136 on collars 137 fast to the shaft. Accordingly when one of the special transaction toggles is operated, a shoulder 135 engages one of the shoulders 136 rocking the shaft 129 and thereby the frame 122 out of operative position. The collars 137 are cut away sufficiently at 138 at the opposite side to shoulders 136, for the purpose of not engaging the arms 134 which are not being operated.

One of each pair of spools 121 is provided with a ratchet wheel 139 (Fig. 14) by which the detail strips are fed the required distance at each operation of the machine. Pivoted on the stud 140, which carries the spool, is a lever 141 carrying an actuating pawl 181 for the ratchet wheel. A pin 142 extending through a slot 143 in the detail strip carrying frame connects the lever 141 with a lever 144, pivoted by a pin 182 to the carrying frame and having a pin 145 which, when the carrying frame is rocked into operative position enters one of a series of openings 146 (Fig. 15) in a slidable plate 147. This plate is mounted on pins 148 carried by a frame of the machine and extending through horizontal slots 149 in the plate. The plate is slid on the pins 148 by a bell crank lever 150 to which it is pivoted by a pin 151. The bell crank lever is pivoted on a stub shaft 152 and is operated by a cam 153 fast to the shaft 60. Thus the detail strip which is in operative position will be fed, as its pin 145 is in position to be moved by slide 147, but the other pins 145 are out of alinement with this slide and therefore the other strips are not fed.

Figure 12:
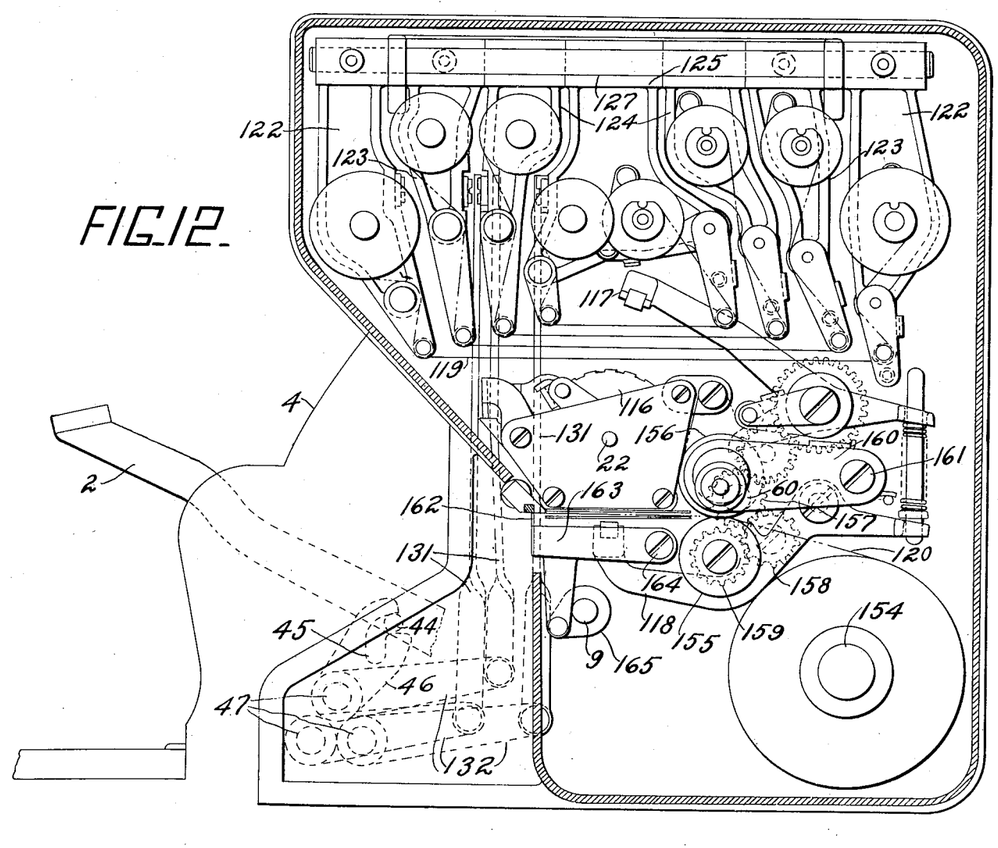
Fig. 12 is a right side elevation of the entire machine with the cabinet of the printer in section.
Figure 13:
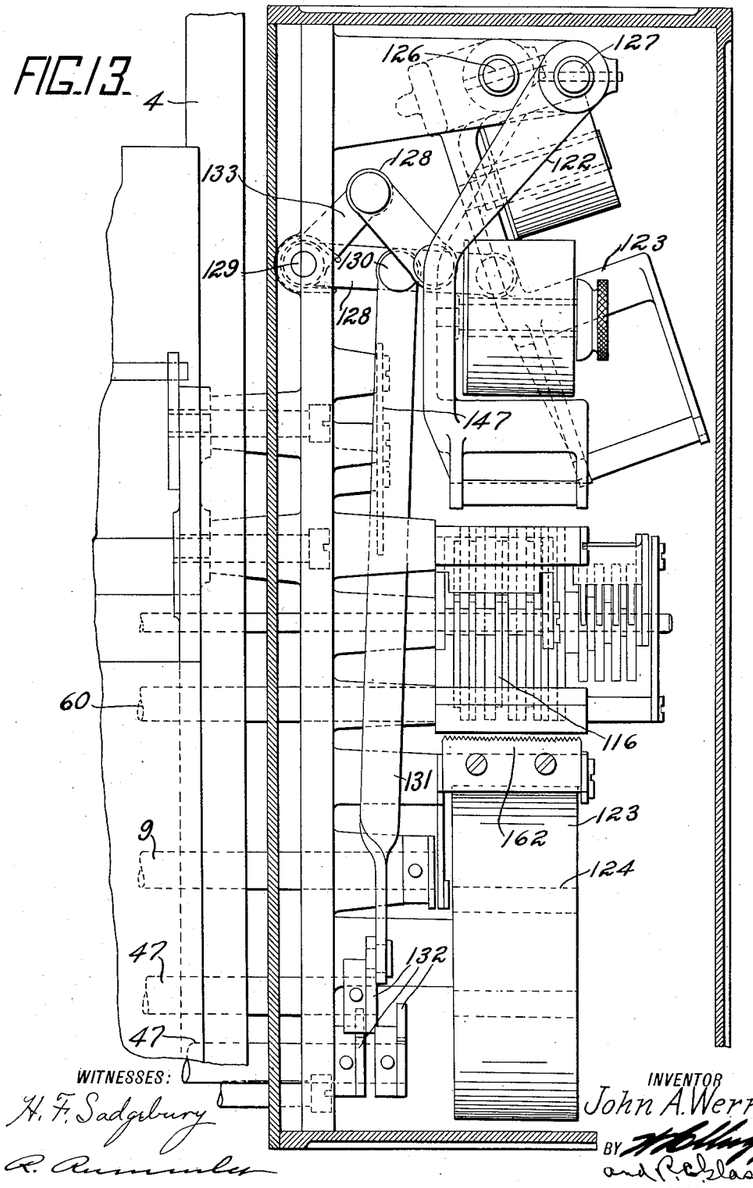
Fig. 13 is a detail in front elevation of the printing mechanism and the record strip carrying frames.
Figure 14:
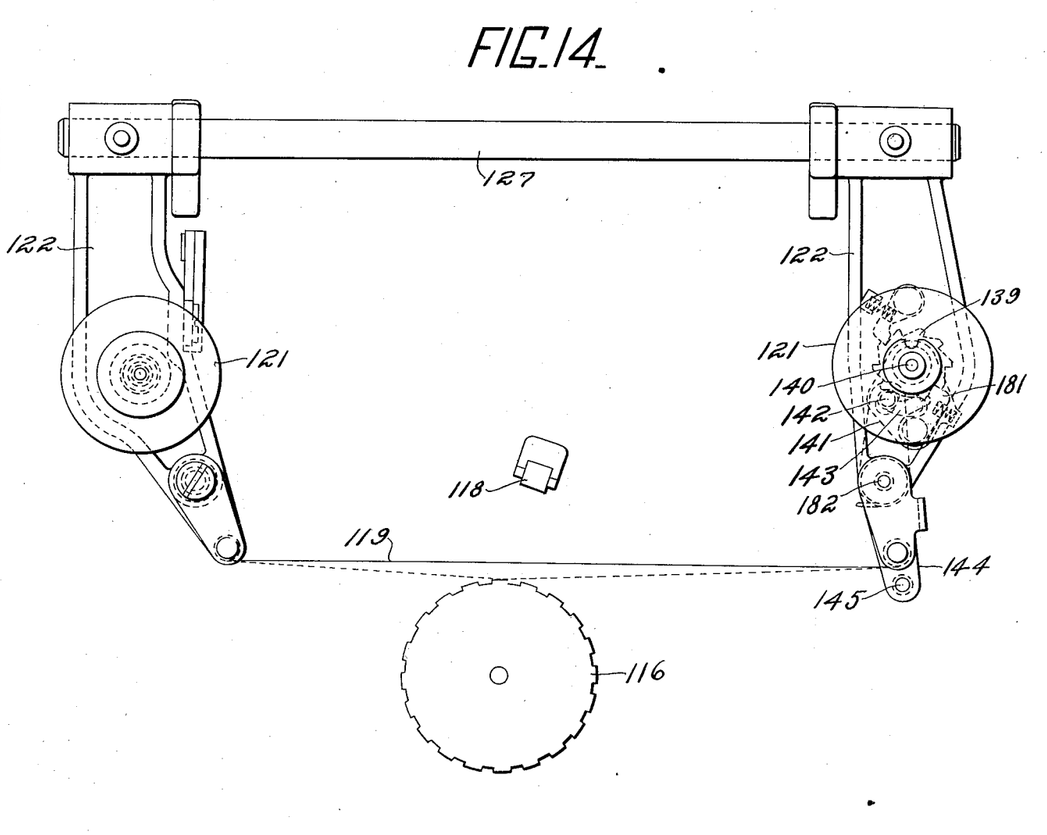
Fig. 14 is a detail in side elevation of one of the record strip carrying frames.
Figure 15:
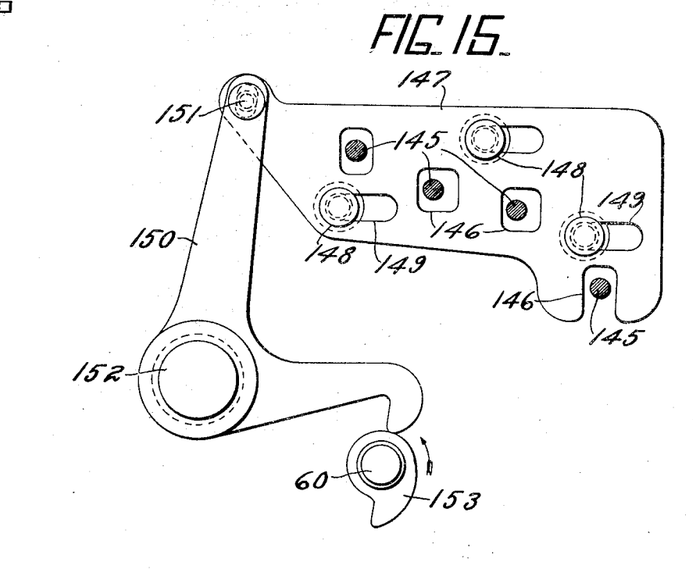
Fig 15. is a detail in side elevation of the record strip feeding mechanism.
Figure 16:
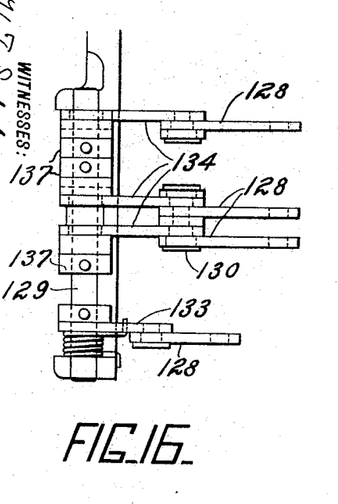
Fig. 16 is a plan view of toggles which are employed to rock the record strip carrying frames into and out of operative positions.
Figure 17:
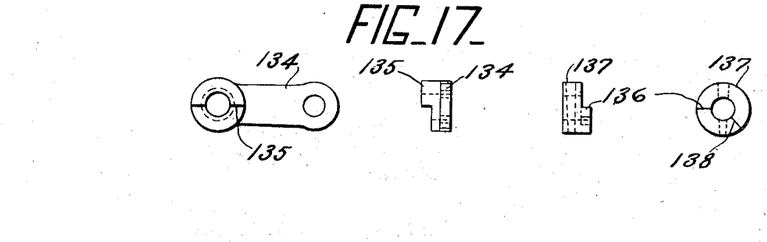
Fig. 17 shows details of arms of the toggle shown in Fig. 16 and co-acting hubs.

The check paper 120 is fed from a roller 154 by a feed roller 155 and an electro-type and dating roller 156 (Fig. 12). These two rollers are geared together and receive movement from a gear 157 on shaft 60 meshing with an intermediate gear 158 meshing with a gear 159 fast to the feed roller 155. The electro-type roller 156 is carried by a frame 160 pivoted on a stub shaft 161 and urged downwardly by a spring surrounding the stub shaft so as to be held with the desired pressure in contact with the roller 155.

The check is fed from these rollers between the platen 118 and the type wheels 116, over a serrated plate 162, and out of the machine. The plate 162 is carried by a frame 163 pivoted to the machine frame by a pin 164 and pivotally connected to an arm 165 fast to one of the key coupler trunnions 9. Upon the return of the key coupler to its home position the serrated plate perforates the check paper and then the printed part of the strip may be easily torn from the remainder of the strip. The perforating mechanism is provided rather than cutting mechanism principally because all of the power required by the machine is furnished by the manually operated keys, and to cut the check strip would require an appreciable addition of power.

Figure 18:
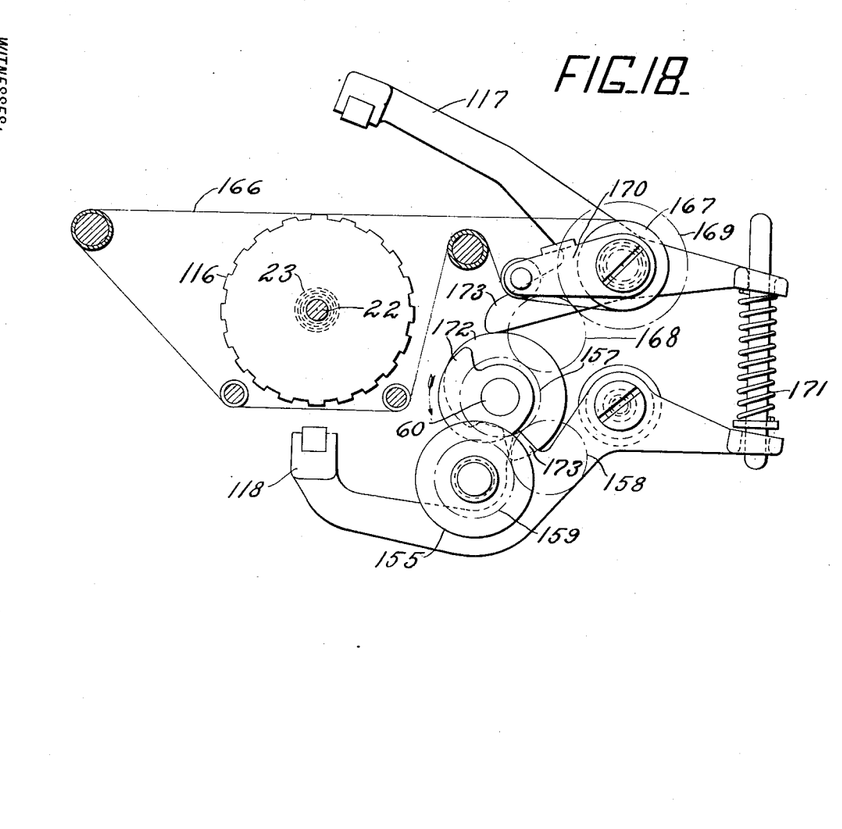
Fig. 18 is a detail in right side elevation showing the platen operating mechanism of the printing mechanism.

An ink ribbon 166 (Fig. 18) passes between the type carriers and the record strips around a feeding roller 167 for the same. The roller 167 is driven from the gear 157 fast to shaft 60 meshing with an intermediate gear 168 meshing with a gear 169 fast to the feed roller. A weighted arm 170 for tensioning the ink ribbon is shown in Fig. 18.

The platen carrying arms extend rearwardly from their pivots and a spring 171 is compressed between the rear ends of the arms, tending to force the platens into engagement with the type carriers but a pair of cams 172 fast to the shaft 60, and engaging extensions 173 of the platen arms normally prevent operation of the same until the desired time.

Operation: To enter a cash transaction, the desired value keys are depressed and the transaction keys are left unoperated thereby leaving the cash totalizer and the cash record strip in operative position. The rocking movement of the depressed keys lifts the key coupler 8 (Fig. 1), its flange 7 entering the recesses 5 to latch depressed keys together and coming before the curved surfaces 6 of undepressed keys locking them in normal position. The corresponding indicators 10 resting on the rear of the keys are lifted into view and the uprights 11 which are carried by the keys differentially rock the segments 13 by engaging steps 15 of the same, overthrow of the segments being prevented by corresponding steps 16 engaging the uprights or lifter bars 11. The differential movement of the segments 13 is communicated to the cash totalizer by segment gears 17 fast to the segments 13 and meshing with the set of racks 20 which carry the set of totalizer actuating racks 26. Before the uprights 11 are moved far enough to engage the segments 13 and to actuate racks 26, shaft 60 is rotated far enough by the racks 64 to rock lever 61 (Fig. 11) by action of cam 59, thereby moving pitman 40 (Fig. 1) rearwardly and causing the cash totalizer to be rocked downwardly as the pawl 35 for co-acting with the cash totalizer frame is normally in engagement therewith. Simultaneously cam 70 (Fig. 10) rocks lever 72, thus, through the link 73 (Fig. 5), rocking shafts 24 and 25 and by the cams 76 and 81 thereon reversely shifting actuating racks 26 and transfer racks 79 (Figs. 6 and 7), so that the transfer racks are carried out of operative position and the actuating racks into operative position. After the totalizer is actuated and before it is rocked upwardly, the racks 26 and 79 are again reversely moved by cam 70 (Fig. 10) so that the transfer racks 79 are brought into operative position. These racks are actuated to effect the transfers by lugs 88 (Fig. 5) on slides 82 provided the slides have been moved into position to be actuated by cams 91, by being engaged by transfer cams 32 and 33 when the totalizer pinions pass from nine to zero.

During the forward movement of racks 26 the type carriers 116 (Fig. 18) are set by the rotation of their shaft 22 and sleeves 23 driven by the segments 17 (Fig. 5). While the type carriers are at rest in their moved position, before the return of the differential mechanism, the platens 117 and 118 are permitted to operate, as at this time cams 172 (Fig. 18) pass clear of the extensions 173 of the platen carrying arms.

If other than cash transactions are entered, one of the transaction keys 2 (Fig. 12) is depressed when the value keys are depressed, thereby rocking one of the shafts 47 causing one of the slides 51 (Fig. 1) to move rearwardly camming its particular bell crank lever 38 into engagement with the respective totalizer frame and by its shoulders 53 shifting the slide 55 which coöperates with the cash totalizer bell crank lever 38 so that it rocks the bell crank lever out of engagement with the cash totalizer frame. Then when pitman 40 is actuated the desired totalizer is rocked into mesh with the actuating racks, the cash totalizer remaining out of mesh. Otherwise the totalizer operation is the same as when a cash transaction is entered.

The rocking of a shaft 47 through an arm 132 and link 131 (Figs. 12 and 13) operates one of the toggles so as to bring the desired record strip into position to be printed on. The actuation of the toggle rocks shaft 129 on which are fast arms of the toggles for the cash record strip carrying frame thereby straightening such toggles and rocking the cash record strip carrying frame out of its normal operative position. The return of the keys by a reverse operation of the totalizer and the record strip selecting mechanism causes the cash totalizer and cash record strip again to be operatively positioned.

While the form of mechanism herein shown and described is admirably adapted to fulfil the objects primarily stated it is to be understood that it is not intended to confine the invention to the one form of embodiment herein shown and described as it is susceptible of embodiment in various forms all coming within the scope of the claims which follow.

What is claimed is:

1. In an accounting machine, the combination with a printing mechanism, of means for operating the same, a plurality of carrying frames for record paper, only one of which is normally in operative position, transaction keys, and means operated by the transaction keys for moving any one of the carrying frames which is out of operative relation with the printing mechanism into operative relation with the same, and the carrying frame which is normally in operative relation out of operative relation.

2. In an accounting machine, the combination with printing mechanism, of means for operating the same, a plurality of pivoted carrying frames for record paper normally out of operative relation with the printing mechanism, transaction keys, and means operated by the transaction keys for rocking any desired carrying frame into operative relation with the printing mechanism.

3. In an accounting machine, the combination with a printing mechanism, of means for operating the same, a plurality of pivoted carrying frames for record paper only one of which is normally in operative position, transaction keys, and means operated by the transaction keys for rocking any one of the carrying frames which is out of operative relation with the printing mechanism into operative relation with the same and the carrying frame which is normally in operative relation out of operative relation.

4. In an accounting machine, the combination with a plurality of record strip carrying frames, of a paper feeding device for the same normally out of operative relation with the record strip carrying frames, transaction keys, and means operated by the transaction keys for moving any one of the carrying frames into operative relation with the feeding mechanism.

5. In an accounting machine, the combination with a totalizing device, of key levers for actuating the totalizing device, transfer mechanism comprising a slide and a rack positioned to be engaged by said slide, means carried by the totalizing device for moving the slide into effective position, and means driven by the key levers for further moving the slide and thereby effecting a transfer.

6. In an accounting machine, the combination with an operating mechanism, of a plurality of totalizing devices, actuating racks for said devices, separate devices, one normally operative and the others normally inoperative, actuated by the operating mechanism for meshing the totalizers with the actuating racks, and means adjustable to destroy the operative relation of said one separate device, and to establish an operative relation of any other of said separate devices.

7. In an accounting machine, the combination with a plurality of totalizing devices, of actuating mechanism therefor, a printing mechanism, a plurality of carrying frames for record paper, one of said totalizing devices being normally in operative relation with the actuating mechanism and one of said carrying frames being normally in operative relation with the printing mechanism, transaction keys, and means controlled by the transaction keys for moving the totalizing device and the carrying frame which are in operative relation out of operative relation and other corresponding totalizing devices and carrying frames into operative relation.

8. In an accounting machine, the combination with a plurality of totalizers, of actuators for said totalizers normally out of operative relation therewith, devices, one for each totalizer, normally holding said totalizers out of said operative relation with the actuators but constructed to move any totalizer into such operative relation, means for selecting said totalizer holding devices so that the selected device upon operation moves its totalizer into operative relation, and common means for operating all of the holding devices at every operation of the operating means, the selected holding device being effective to move its totalizer into operative relation.

9. In an accounting machine, the combination with a plurality of totalizers and actuators therefor, of separate devices, one for each totalizer normally holding the same out of operative relation with said actuators, a common means for actuating all said separate devices at every operation of said means, slides constructed to connect any of said separate devices to its totalizer so that upon operation of the actuating means such totalizer will be moved into operative relation with the actuators, and transaction keys having connections to move said slides.

10. In an accounting machine, the combination with a plurality of totalizers and actuators common thereto, of pivoted elements normally holding said totalizers separately out of operative relation with said actuators, a member common to and constructed to actuate all said pivoted elements, movable elements constructed to connect any of said pivoted elements to said common member, and transaction keys having connections to actuate said movable elements.

11. In an accounting machine, the combination with a totalizer, of actuating and transfer racks therefor, oppositely acting cams on which said actuating and said transfer racks are carried, and means for oscillating said cams and thereby engaging and disengaging said actuating and said transfer racks with said totalizer alternately.

12. In an accounting machine, the combination with a totalizer, of actuating and transfer racks therefor, shafts guiding all said racks, oppositely placed cams on which said actuating and said transfer racks are carried, and means for oscillating all said cams and thereby engaging and disengaging said totalizer with said actuating and said transfer racks alternately.

13. In an accounting machine, the combination with type carriers and means for controlling their movements, of a plurality of record carrying frames constructed to be nested one inside another, and all normally out of operative relation with the type carriers, and separate means for moving any one of said carrying frames so as to establish an operative relation between it and said type carriers.

14. In an accounting machine, the combination with a totalizer and actuating devices therefor, of a special counter, a frame carrying both said totalizer and said counter, means for moving said frame and thereby producing engagement of said totalizer with said actuating devices, and an operating element for said counter positioned to be engaged and actuated by an element of said carrying frame when the same is operated by said moving means.

15. In a machine of the class described, the combination with printing mechanism, of a series of record strips adapted to be selectively brought into operative relation with said printing mechanism, and means whereby operative relation between said printing mechanism and either of the record strips may be established without moving all of said strips.

16. In an accounting machine, the combination with a plurality of movable frames each carrying a record strip, a single printing mechanism, manipulative means and mechanism controlled thereby for selecting and independently moving either of the frames to bring its record strip into position to be printed upon by the printing mechanism.

17. In an accounting machine, the combination with a single printing mechanism, a plurality of movable frames each carrying a separate record strip one of the frames normally in such position that its record strip may be printed upon by the printing mechanism and the remaining frames normally out of such position, and manipulative means and connections whereby the frame carrying the record strip normally in position to be printed upon may be withdrawn and one of the remaining frames with its record strip substituted therefor without movement of any other remaining frame.

18. In a machine of the class described, the combination with a printing mechanism, of a plurality of movable record strip carrying frames one of which is normally in operative relation with the printing mechanism and the other out of such relation, a feeding mechanism adapted to feed the record strip which is in operative relation with the printing mechanism, and means for moving the record strip carrying frame which is in operative relation with the feeding device and the printing mechanism out of such relation and one of the remaining frames into such relation whereby its strip may be fed by the feeding device and printed upon by the printing mechanism and without movement of any other remaining frame.

19. In a machine of the class described, the combination with a totalizer, of separate actuating and transfer racks therefor, two sets of means for the actuating racks and the transfer racks respectively, for moving their respective racks into and out of engagement with the totalizer, and connections whereby when either of the sets of racks is moved toward the totalizer the other set is moved away from the same.

20. In a machine of the class described, the combination with printing mechanism, of a plurality of record strip carrying frames movable in a direction not at right angles to the printing line of the printing mechanism, and means for moving any of said frames to bring its record strip in position to be printed upon by the printing mechanism.

21. In a machine of the class described, the combination with printing mechanism, of a plurality of record strip carrying frames movable laterally relative to said printing mechanism, a single feeding device for the record strips, and means for selectively moving any of the frames to bring its record strip into position to be printed upon by the printing mechanism and to operatively connect the feeding mechanism to feed such strip without moving all of said strips.

22. In a machine of the class described, the combination with a movable actuating member, of a plurality of record strip carrying frames normally out of alinement therewith and having means for feeding the strip, and means for selectively moving the frames laterally relative to the actuating member to operatively connect the feeding means for the record strip of any movable frame with the movable actuating member and without moving all of said strips.

23. In a machine of the class described, the combination with a movable actuating device having a plurality of openings, of a plurality of record strip carrying frames having means whereby the record strip may be fed, and means for selectively moving the frames to connect the feeding means of the selected frame with the actuating device through engagement in a corresponding opening in the latter.

24. In a machine of the class described, the combination of driving mechanism; a printing mechanism; a series of record strips; means for bringing either of said record strips into coöperative relationship with the printing mechanism and without moving all of said strips; and means for taking a printing impression upon the record strip brought into coöperative relationship with the printing mechanism.

25. In a machine of the class described, the combination of a totalizer, a set of actuating and transfer racks therefor; two sets of means for the actuating racks and transfer racks respectively, for moving their respective racks into and out of engagement with the totalizer; means for moving the totalizer into position to be engaged by the actuating racks and transfer racks; and connections whereby when either of the sets of racks is moved toward the totalizer, the other set is moved away from the same.

26. In a machine of the class described, the combination of printing mechanism; a plurality of independently movable record strip carrying frames, one of which is normally in operative relation with the printing mechanism; feeding mechanism adapted to feed the record strip which is in operative relation with the printing mechanism; transaction keys; and means controlled by the transaction keys for moving the carrying frame in operative relation with the feeding and printing mechanisms out of such relation and another frame into such relation whereby the latter strip may be fed by the feeding device and printed upon by the printing mechanism.

27. In an accounting machine, the combination of a single printing mechanism; means for operating the same; a plurality of frames each carrying a separate record strip, one of the frames being normally in such a position that its record strip may be printed upon by the printing mechanism; transaction keys; and means controlled by the transaction keys for carrying the record strip normally in operative relationship with the printing mechanism out of such relationship and one of the remaining frames into such relationship and without moving all of the frames.

28. In an accounting machine, the combination with a plurality of transaction keys, of a totalizer and a record strip carrier for each key, a set of actuators common to all of the totalizers, a platen common to all of the record strip carriers, and means whereby operation of a transaction key will move its totalizer and its strip carrier into operative relation to the actuators and the platen respectively.

29. In an accounting machine, the combination with a plurality of transaction keys, of a totalizer and a record strip carrier for each key, said totalizers and record strip carriers being normally in ineffective positions, and means whereby operation of a transaction key will move its totalizer and strip carrier into effective position.

30. In an accounting machine, the combination with a totalizer, of actuators therefor, said totalizer being normally out of operation to the actuators, type carriers, a device carrying a record strip designed to receive impressions from the type carriers but normally out of operative relation thereto, and a key lever and connections operable to move the totalizer and record strip carrying device into operative relation to the actuators and type carriers respectively.

31. In an accounting machine, the combination of a movable frame, a shaft carried by said frame, totalizer elements mounted on said shaft, actuators for the totalizer elements, means for moving the frame to carry the totalizer elements into operative relation to the actuators, a counter mounted on the aforesaid shaft, and means carried by the frame for actuating the counter during movement of the frame.

In testimony whereof I affix my signature in the presence of two witnesses.

JOHN A. WERNER.

Witnesses:
W. M. McCarthy,
Carl W. Beust.

Copies of this patent may be obtained for five cents each, by addressing the "Commissioner of Patents, Washington, D. C."